(12) United States Patent
Pretty

(10) Patent No.: US 10,717,540 B2
(45) Date of Patent: Jul. 21, 2020

(54) LATCH HOOKS, LATCH HOUSINGS, AND LATCH ASSEMBLIES

(71) Applicant: ROHR, INC., Chula Vista, CA (US)

(72) Inventor: Michael Sean Pretty, Jamul, CA (US)

(73) Assignee: ROHR, INC., Chula Vista, CA (US)

(*) Notice: Subject to any disclaimer, the term of this patent is extended or adjusted under 35 U.S.C. 154(b) by 190 days.

(21) Appl. No.: 15/921,481

(22) Filed: Mar. 14, 2018

(65) Prior Publication Data
US 2018/0201385 A1    Jul. 19, 2018

Related U.S. Application Data

(62) Division of application No. 14/262,463, filed on Apr. 25, 2014, now Pat. No. 9,963,237.

(51) Int. Cl.
*B64D 29/06* (2006.01)
*E05C 19/10* (2006.01)
*E05B 17/00* (2006.01)

(52) U.S. Cl.
CPC .......... *B64D 29/06* (2013.01); *E05B 17/0062* (2013.01); *E05C 19/10* (2013.01);
(Continued)

(58) Field of Classification Search
CPC .... Y10S 292/49; Y10S 292/65; Y10S 292/66; Y10T 292/0911; Y10T 292/0913; Y10T 292/0914; Y10T 292/0917; Y10T 292/0945; Y10T 292/0946; Y10T 292/0949; Y10T 292/0886; Y10T 292/0887; Y10T 292/089; Y10T 292/087; Y10T 292/0871; Y10T 292/202; Y10T 292/207; Y10T 292/696; Y10T 70/20;
(Continued)

(56) References Cited

U.S. PATENT DOCUMENTS 2,613,974 A * 10/1952 Llewhellin ............ E05C 19/145
  292/256
2,695,803 A    11/1954 Mills
(Continued)

OTHER PUBLICATIONS

USPTO Office Action (Restriction Requirement) dated Jan. 21, 2016 for U.S. Appl. No. 14/262,463, filed Apr. 25, 2014.
(Continued)

*Primary Examiner* — Christine M Mills
(74) *Attorney, Agent, or Firm* — Snell & Wilmer, L.L.P.

(57) ABSTRACT

Latch housing assemblies, latch hook assemblies, and latch assemblies are disclosed. Various disclosed latch housing assemblies include a latch pin coupled to an inner housing, and an outer housing having an inner surface coupled to an outer surface of the inner housing via at least one of a fuse pin and a spring. Various disclosed latch hook assemblies include a latch hook coupled to a latch housing, a weak point in the latch housing disposed between an inboard mount and an outboard mount, and a catch member mounted to the inboard mount and the outboard mount. Various disclosed latch assemblies include a latch housing, a bolt, and a deformable bushing at least partially surrounding the bolt, the deformable bushing configured to deform about a radius in response to a compressive load of about 1,000 $lb_f$ to about 3,000 $lb_f$.

8 Claims, 14 Drawing Sheets

(52) U.S. Cl.
CPC .......... *Y10S 292/65* (2013.01); *Y10T 70/7949* (2015.04); *Y10T 292/0945* (2015.04)

(58) Field of Classification Search
CPC . Y10T 70/25; Y10T 20/7949; E05B 17/0054; E05B 17/0062; E05B 9/00; E05C 19/10; E05C 19/14; E05C 19/145; B64D 29/06; B64D 29/08; B64D 33/02; B64D 2033/0286; B64C 7/02; B64C 1/1446; B64C 1/14; F02K 1/72; F02K 1/70; F02K 1/625
USPC ..... 292/95, 96, 109, 110, 113, 97, 100, 246, 292/247, 63, 64, 66, 256.5, 256.61, 292/341.15, DIG. 49, DIG. 65, DIG. 66; 244/53 B, 129.4, 129.5, 110 B; 70/1.5, 70/1.7, 422
See application file for complete search history.

(56) References Cited

U.S. PATENT DOCUMENTS

| | | | | |
|---|---|---|---|---|
| 2,710,214 | A | | 6/1955 | Mills |
| 2,714,032 | A | | 7/1955 | Mills |
| 2,894,777 | A | | 7/1959 | Hogan |
| 3,237,265 | A | * | 3/1966 | Florian ................. B60R 22/324 24/602 |
| 3,338,612 | A | * | 8/1967 | Howard ............... E05B 63/127 292/340 |
| 3,597,949 | A | * | 8/1971 | Nigrelli ............... E05B 17/0058 70/1.5 |
| 3,744,832 | A | * | 7/1973 | Casey ..................... A62C 2/12 292/101 |
| 3,981,467 | A | * | 9/1976 | Ludlow ................. B64G 1/645 244/173.1 |
| 4,161,804 | A | * | 7/1979 | D'Hooge ................ A62C 2/12 16/48.5 |
| 4,320,912 | A | | 3/1982 | Grace et al. |
| 4,365,775 | A | | 12/1982 | Glancy |
| 5,060,888 | A | * | 10/1991 | Vezain .................. B64G 1/222 220/327 |
| 5,799,521 | A | | 9/1998 | Kennedy |
| 7,252,311 | B2 | | 8/2007 | Pratt et al. |
| 7,393,167 | B2 | * | 7/2008 | Dowty ............... B64D 11/0619 410/105 |
| 8,616,146 | B2 | * | 12/2013 | Martin ................. B64C 25/001 116/203 |
| 8,851,417 | B2 | * | 10/2014 | Sandy .................... B64D 27/26 244/54 |
| 2005/0024815 | A1 | * | 2/2005 | Pratt ..................... B64D 29/06 361/600 |
| 2009/0173823 | A1 | | 7/2009 | Shelzer |
| 2011/0014044 | A1 | * | 1/2011 | Vauchel ................ B64D 29/06 415/214.1 |
| 2012/0043978 | A1 | | 2/2012 | Eriksen et al. |
| 2014/0265355 | A1 | * | 9/2014 | Tien ..................... E05B 65/104 292/21 |
| 2015/0266587 | A1 | * | 9/2015 | Pretty ................... B64D 29/06 415/214.1 |

OTHER PUBLICATIONS

USPTO Office Action (First Action Interview Pilot Program Pre-Interview Communication) dated Apr. 21, 2016 for U.S. Appl. No. 14/262,463, filed Apr. 25, 2014.
USPTO Office Action (Applicant-Initiated Interview Summary) dated Jun. 29, 2016 for U.S. Appl. No. 14/262,463, filed Apr. 25, 2014.
USPTO Office Action (Final) dated Nov. 2, 2016 for U.S. Appl. No. 14/262,463, filed Apr. 25, 2014.
USPTO Office Action (Advisory Action and Examiner-Initiated Interview Summary) dated Jan. 20, 2017 for U.S. Appl. No. 14/262,463, filed Apr. 25, 2014.
USPTO Office Action (Non-Final) dated Feb. 22, 2017 for U.S. Appl. No. 14/262,463, filed Apr. 25, 2014.
USPTO Office Action (Final) dated Sep. 8, 2017 for U.S. Appl. No. 14/262,463, filed Apr. 25, 2014.
USPTO Office Action (Advisory Action) dated Nov. 20, 2017 for U.S. Appl. No. 14/262,463, filed Apr. 25, 2014.
Notice of Allowance and Fee(s) Due dated Jan. 22, 2018 for U.S. Appl. No. 14/262,463, filed Apr. 25, 2014.

* cited by examiner

LATCH HOOKS, LATCH HOUSINGS, AND LATCH ASSEMBLIES

CROSS-REFERENCE TO RELATED APPLICATIONS

This application is a divisional of, and claims priority to, and the benefit of U.S. Non-Provisional application Ser. No. 14/262,463, entitled "LATCH HOOKS, LATCH HOUSINGS, AND LATCH ASSEMBLIES," filed on Apr. 25, 2014, is hereby incorporated by reference in its entirety.

FIELD

The present disclosure relates to latch hooks, latch housings, and latch assemblies capable of being used in an aircraft.

BACKGROUND

Latch hooks, latch assemblies, and latch housings are commonly used in the nacelle of an aircraft, for example, in fan cowls and the inner fixed structures of thrust reversers. Thrust reversers may typically be structurally sized based on an overpressure event (e.g., a duct burst event) to allow for release of the overpressure. Thus, some inner fixed structures are sized to withstand the overpressure, increasing the weight of the fan cowls and thrust reversers, which may increase fuel costs throughout the life of the aircraft.

SUMMARY

Latch housing assemblies are provided comprising a latch pin coupled to an inner housing and an outer housing having an inner surface coupled to an outer surface of the inner housing via at least one of a fuse pin and a spring.

A latch hook assemblies are provided comprising a latch hook coupled to a latch housing, a weak point in the latch housing disposed between an inboard mount and an outboard mount, and a catch member mounted to the inboard mount and the outboard mount.

A latch assembly comprising a latch housing, a bolt, and a deformable bushing at least partially surrounding the bolt, the deformable bushing configured to deform about a radius in response to a compressive load of about 1,000 $lb_f$ to about 3,000 $lb_f$.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
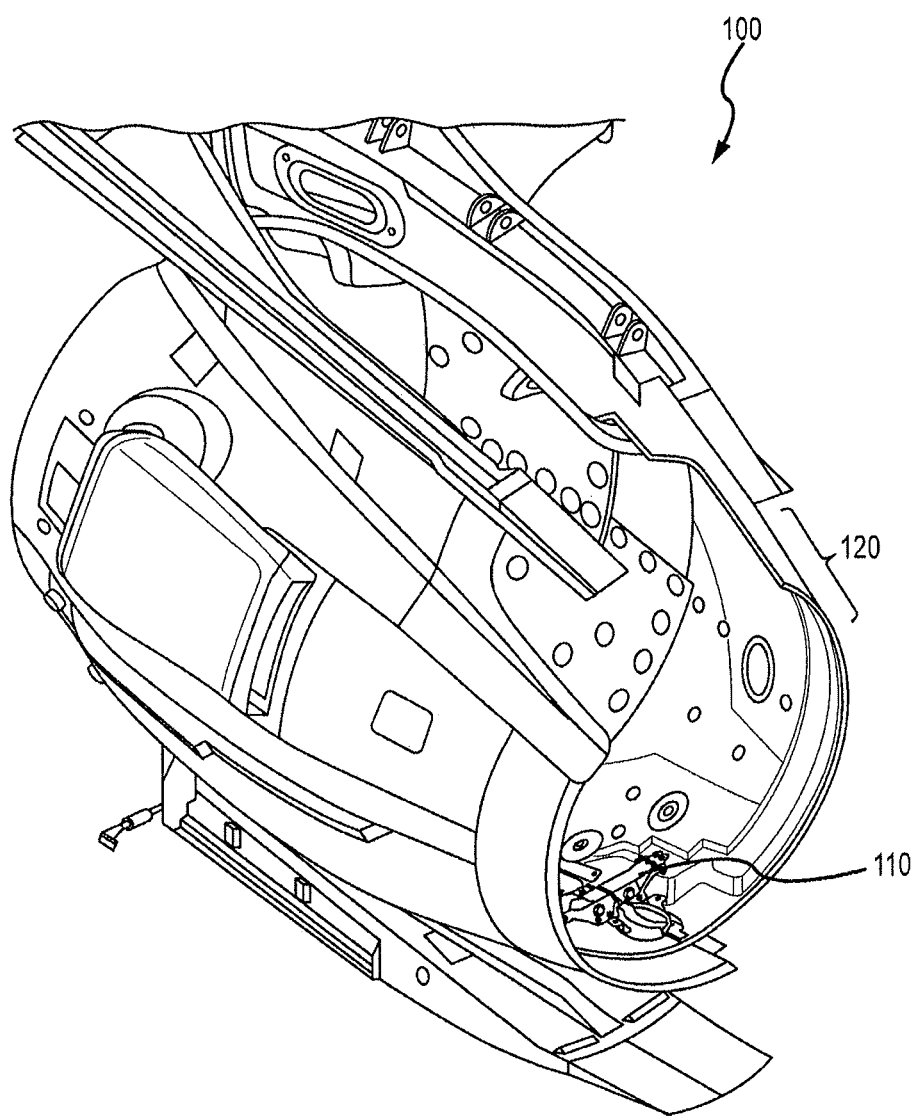
FIG. 1 illustrates an inner fixed structure of a thrust reverser, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, material, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "outboard" may define an element or portion of an element that is situated radially outer to or away from another, radially inward, element or portion of an element. Thus, an engine core may be situated radially inboard of an inner fixed structure ("IFS") and/or a fan casing, as described herein. As used herein, "inboard" may define the element or portion of the element that is situated radially inward in relation to an outboard element.

Aircraft thrust reversers are often held together with latch assemblies along various axial distances along the thrust reverser. As described above, a typical thrust reverser may include an inner fixed structure ("IFS"). The IFS may comprise two halves, which may be joined together with a latch mechanism (e.g., at the bottom of the IFS). For example, the inner fixed structure of a thrust reverser may include a latch assembly at the bottom of the inner fixed structure to allow the thrust reverser to be hinged open to facilitate access to the engine core.

From time to time, a thrust reverser may experience more pressure than it is typically designed to handle (i.e., an overpressure event), for example in the event that an engine bleed air duct bursts. Large ducts come from various stages of compressors in an aircraft engine under high temperatures and high pressures. In the event one of the ducts bursts, the inner fixed structure tends to be over pressurized. In that regard, an overpressure event tends to exert a radially outward pressure upon the IFS of a thrust reverser. In response to the radially outward pressure, a thrust reverser or portions thereof may fail.

Accordingly, pressure relief doors may be provided to release pressure from the core cavity in the event of an overpressure event (e.g., a burst pneumatic duct) because typical conventional IFS are more or less sealed, and thus, do not allow for the release of overpressure. Accordingly, the size of the IFS is commonly sized to withstand an overpressure event in the event the pressure relief doors were to fail. In that regard, it is desirable for systems and methods that may allow the thrust reverser IFS to radially expand in response to an overpressure event in a controlled manner and, thus, reduce the size of the IFS. By reducing the size of an IFS, the overall size and weight of the nacelle may be reduced, and savings in fuel costs from operation of an aircraft may be realized. Furthermore, decreasing the weight of the IFS may help cause smaller deflection for fire sealing. Accordingly, in various embodiments, separation of the latch hook assembly, the latch housing assembly, and/or the latch assembly may allow the enclosed IFS to open and/or separate. In various embodiments, allowing the enclosed IFS to open and/or separate, may permit a release of overpressure during a burst duct event, and thus, reduce the size of the IFS.

For example, with temporary reference to FIG. 1, FIG. 1 illustrates an inner fixed structure of an aircraft according to various embodiments. Inner fixed structure 100 may comprise the aft end 120 of the inner fixed structure 100 of a thrust reverser, which may be held together by latch assembly 110.

Figure 2A:
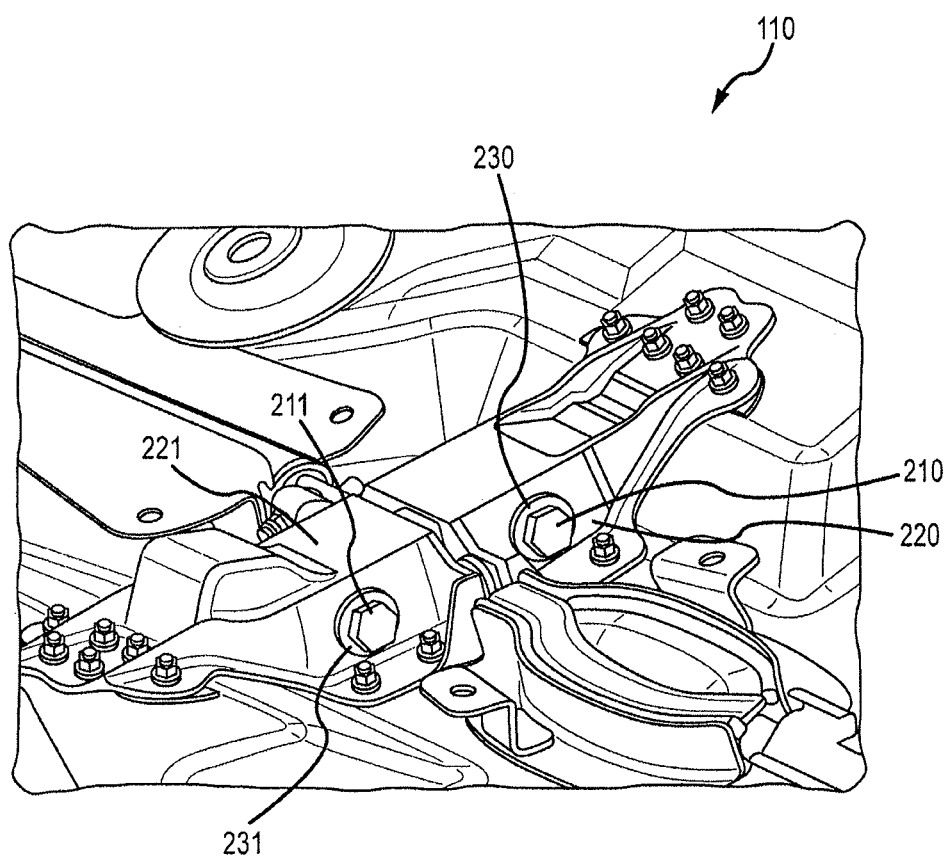
FIG. 2A illustrates a latch assembly, in accordance with various embodiments.

Latch assemblies typically comprise a latch mechanism operated by a handle on the outside of the flow surface. Accordingly, when the handle is operated, the latch mechanism will disengage, allowing access to the inner components of the engine and thrust reverser system. With reference to FIG. 2A, latch assembly 110 is illustrated from a view inside inner fixed structure 100 according to various embodiments. Latch assembly 110 may comprise a first latch housing 220, a second latch housing 221, a first bolt 210, and a second bolt 211 according to various embodiments. In various embodiments, first bolt 210 may be inserted into first bushing 230 and second bolt 211 may be inserted into second bushing 231 as illustrated in FIG. 2A. In various embodiments, first latch housing 220 may be complementary to the second latch housing 221.

Figure 2B:
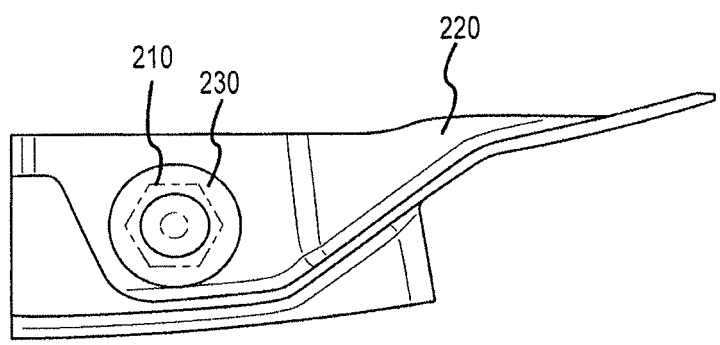
FIG. 2B illustrates a latch housing and bushing, in accordance with various embodiments.

According to various embodiments, first latch housing 220 may comprise a first bushing 230. In various embodiments, first bushing 230 may be integral to first latch housing 220. For example, with reference to FIG. 2B, first latch housing 220 and first bushing 230 are illustrated with first bolt 210 transparently shown for improved clarity. First bushing 230 may be outboard of the centerline of the inner fixed structure 100 according to various embodiments. Similarly, according to various embodiments, corresponding second latch housing 221 may comprise second bushing 231, which may be outboard of the centerline of the inner fixed structure.

According to various embodiments, the bushing may be a deformable bushing at an area at least partially surrounding the bolt, and the deformable bushing may configured to deform about a radius in response to a compressive load between about 1,000 $lb_f$ (about 4,448 N) to about 3,000 $lb_f$ (about 13,344 N), a compressive load between about 1,500 $lb_f$ (about 6,672 N) to about 2,500 $lb_f$ (about 11,120 N), or a compressive load of about 2,000 $lb_f$ (about 8,896 N).

According to various embodiments, the bushing may be configured to irreversibly deform in response to the compressive load. For example, the bushing may comprise various metals or metal alloys capable of irreversibly deforming in response to a compressive load. Exemplary metals according to various embodiments include steel, copper, aluminum, titanium, nickel, vanadium, and alloys thereof. The geometry of the bushing is not particularly limited in various embodiments and may be altered according to various design considerations.

In various embodiments, the bushing may be configured to reversibly deform in response to the compressive load, for example in response to a compressive load between about 1,000 $lb_f$ (about 4,448 N) to about 3,000 $lb_f$ (about 13,344 N), a compressive load between about 1,500 $lb_f$ (about 6,672 N) to about 2,500 $lb_f$ (about 11,120 N), or a compressive load of about 2,000 $lb_f$ (about 8,896 N). For example, various embodiments may comprise bushings made from a polymer, a metal, or combination thereof. Exemplary polymers according to various embodiments may include rubber, polytetrafluoroethylene ("PTFE"), polyethylene terephthalate ("PET").

Figure 2C:
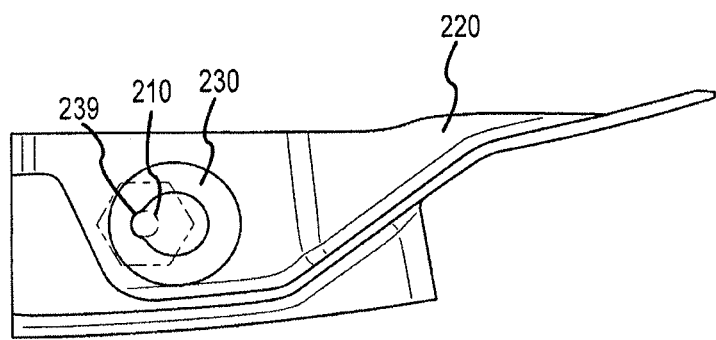
FIG. 2C illustrates a latch housing and bushing during an overpressure event, according to various embodiments.

For example, FIG. 2C illustrates first bushing 230 being deformed during an overpressure event, according to various embodiments. For example, according to various embodiments, during an overpressure event, the two halves of inner fixed structure 100 may desire to expand due to the inboard pressure exerted on the aft end 120 of inner fixed structure 100 (shown in FIG. 1). Accordingly, in various embodiments, the overpressure may exert a force on the inboard portion of first bushing 230 and first bolt 210. Likewise, in various embodiments, a force may be exerted on the inboard portion of corresponding second bushing 231 (shown in FIG. 2A). Thus, as demonstrated by FIG. 2C, first bushing 230 may deform 239 due to the force exerted on the bushing at the interface with first bolt 210, according to various embodiments. In various embodiments, this may allow the inner fixed structure 100 shown in FIG. 1 to expand and better accommodate the overpressure and, thus, prevent damage to the thrust reverser system during an overpressure event.

Figure 3A:
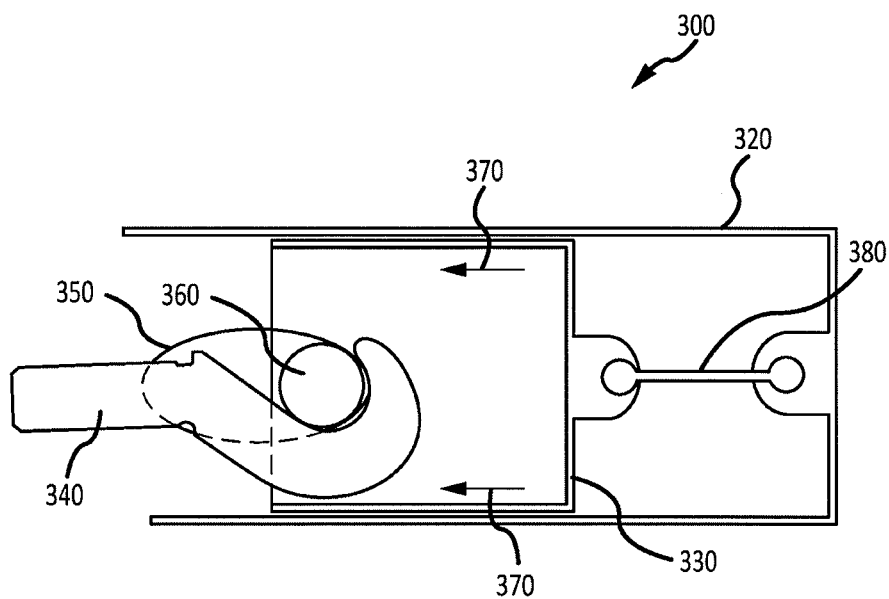
FIG. 3A illustrates a latch housing assembly, in accordance with various embodiments.

With reference to FIG. 3A, FIG. 3A illustrates a latch housing assembly, in accordance with various embodiments. Latch housing assembly 300 may comprise a fuse pin 380 coupled to an inner housing 330 and an outer housing 320. According to various embodiments, during a burst duct event, the increase in pressure may cause latch hook 340 to exert a tensile load on latch pin 360 contained within slotted hole 350 and, thus, exert tensile load 370 on inner housing 330. The tensile load 370 on inner housing may then be exerted on fuse pin 380.

Figure 3B:
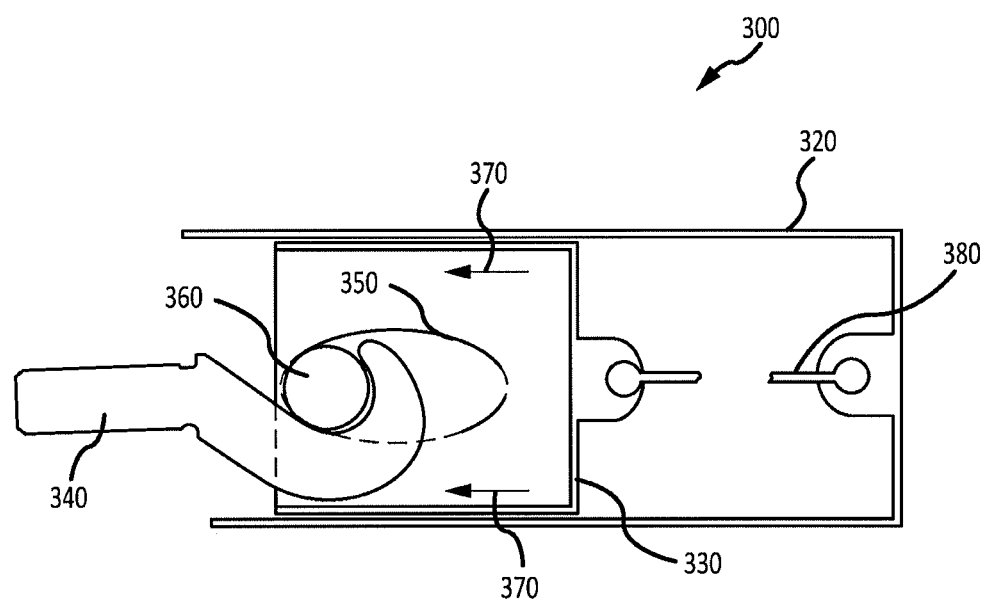
FIG. 3B illustrates a latch housing assembly during an overpressure event, in accordance with various embodiments.

According to various embodiments, fuse pin 380 may be configured to separate at a predetermined tensile load, for example, 1,000 $lb_f$ (about 4,448 N) to about 3,000 $lb_f$ (about 13,344 N), a tensile load between about 1,500 $lb_f$ (about 6,672 N) to about 2,500 $lb_f$ (about 11,120 N), or a tensile load of about 2,000 $lb_f$ (about 8,896 N). Upon separation of fuse pin 380, inner housing 330 and outer housing 320 may separate, as illustrated in FIG. 3B. Accordingly, in response to a tensile load on a latch housing assembly exceeding between about 1,000 lb$_f$ to about 3,000 lb$_f$ in various embodiments, separation of inner housing 330 and outer housing 320 may occur. The separation of the inner latch housing and the outer latch housing may allow the two halves of the IFS to separate, relieving overpressure during a burst duct event. Thus, in various embodiments, the separation of the latch housing assembly may protect various components of the thrust reverser system.

According to various embodiments, permanent separation may be desirable to indicate an overpressure event (e.g., a duct burst event) to maintenance ground crew, for example, due to manufacturer or airline specifications and/or regulations. As used herein, the term "permanent separation" may include any separation which is not self-correcting. For example, according to various embodiments, fuse pin 380 may separate irreversibly, requiring replacement by maintenance crews.

Figure 4A:
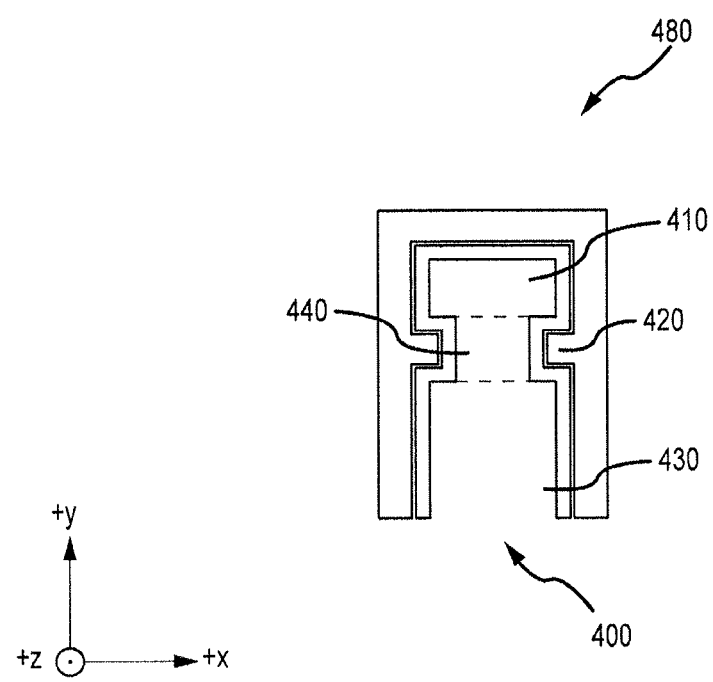
FIG. 4A illustrates a fuse pin, in accordance with various embodiments.

According to various embodiments, fuse pin 380 is not particularly limited. For example, in various embodiments, fuse pin 380 may be a shear pin. With reference to FIG. 4A, FIG. 4A illustrates shear pin 480, in accordance with various embodiments. Shear pin 480 may comprise shear pin outer housing 420 and an inner shear pin 400 comprising pin head 410 connected to pin body 430 via pin connector 440. According to various embodiments, in response to tensile forces on shear pin 480, pin connector 440 may be configured to separate at a predetermined tensile force (e.g., about 1,000 lb$_f$ to about 3,000 lb$_f$). Inner shear pin 400 is not particularly limited and may comprise various geometries or may be comprised of various materials. Exemplary materials include aluminum, copper, nickel, silver, tin, steel and alloys thereof.

Figure 4B:
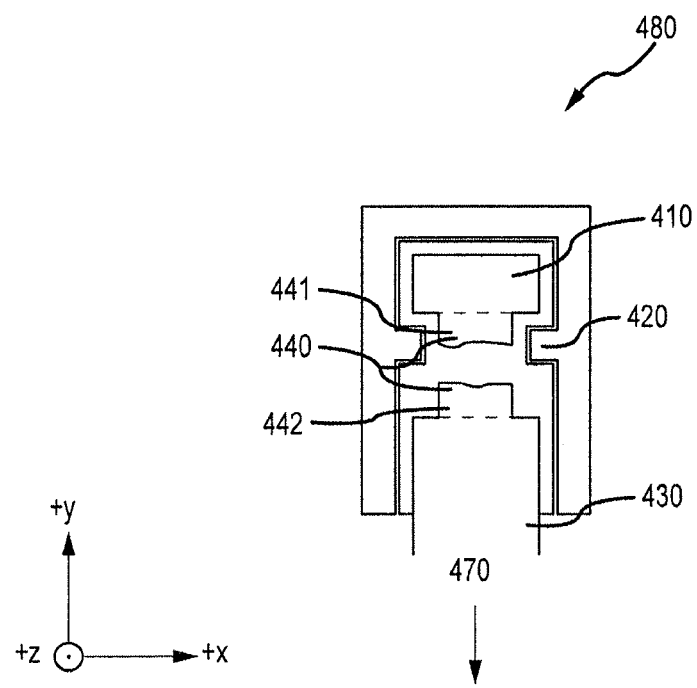
FIG. 4B illustrates a fuse pin during an overpressure event, in accordance with various embodiments.

With reference to FIG. 4B, FIG. 4B illustrates shear pin 480 separating in accordance with various embodiments. In various embodiments, when tensile force 470 is exerted on pin body 430 (e.g., in the negative y-direction), the tensile load may be transferred to pin connector 440 (shown in FIG. 4A). The tensile force on pin connector 440 may then be transferred to pin head 410, which in various embodiments, may become constrained against shear pin outer housing 420. In various embodiment, this may cause pin connector 440 to separate into a first part 441 (connected to pin head 410) and a second part 442 (connected to pin body 430).

According to various embodiments, a shear pin may be desirable, because permanent separation of a shear pin may indicate an overpressure event to maintenance ground crews. Moreover, in various embodiments, use of a shear pin may be desired because of reduced costs and ease of replacement by maintenance crews. In various embodiments, this may allow for improved aircraft turnaround time.

According to various embodiments, reversible separation may be desirable, for example, to reduce maintenance costs and improve aircraft turnaround time. As used herein, the term "reversible separation" may include any separation which tends to be self-correcting. For example, according to various embodiments and with reference to FIG. 3C, a spring 390 may reversibly extend during an overpressure event (e.g., a duct burst event) and may return to the spring's original position once the pressure decreases to acceptable operating pressures.

Figure 3C:
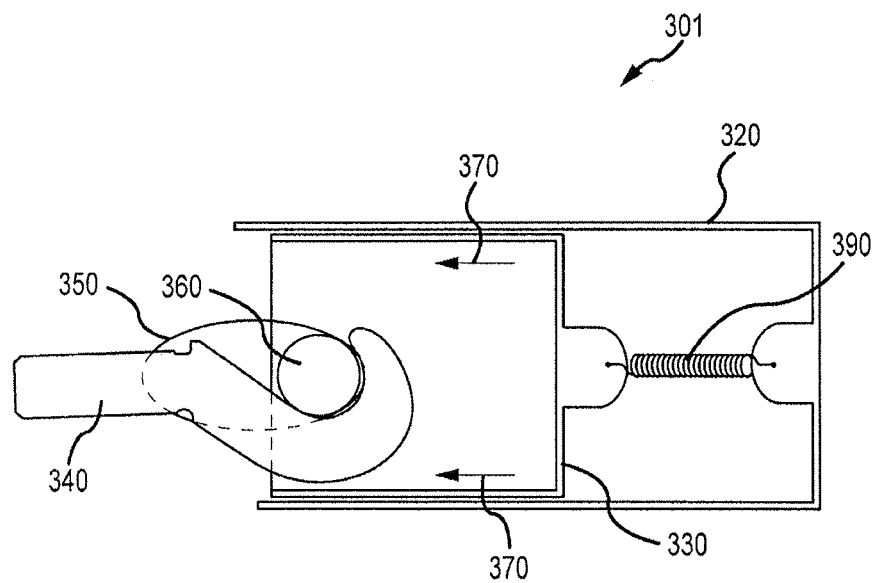
FIG. 3C illustrates a latch housing assembly, in accordance with various embodiments.

Thus, in various embodiments, fuse pin 380 may be replaced with spring 390 to allow for reversible separation of latch housing assembly 300. With reference to FIG. 3C, FIG. 3C illustrates a latch housing assembly in accordance with various embodiments. Latch housing 301 may comprise spring 390 coupled to an inner housing 330 and an outer housing 320 having an inner surface coupled to an outer surface of the inner housing 330 via spring 390. According to various embodiments, during a burst duct event, the increase in pressure may cause latch hook 340 to exert a tensile load on latch pin 360 contained within slotted hole 350 and, thus, exert tensile load 370 on inner housing 330. The tensile load 370 on inner housing may then be exerted on spring 390.

In various embodiments, spring 390 (shown in FIG. 3C) may have a spring constant between about 1,000 lb$_f$/ft (about 1,356 N/m) to about 3,000 lb$_f$/ft (about 4,067 N/m), between about 1,500 lb$_f$/ft (about 2,034 N/m) to about 2,500 lb$_f$/ft (about 3,390 N/m), or about 2,000 lb$_f$/ft (about 2,711 N/m) and, thus, may permit temporary separation of inner housing 330 and outer housing 320 during an overpressure event (e.g., a duct burst event). Accordingly, in response to a tensile load on a latch housing assembly (e.g., due to an overpressure event), separation of the latch housing assembly may relieve internal pressure on the IFS and, thus, protect various aircraft components.

Figure 5A:
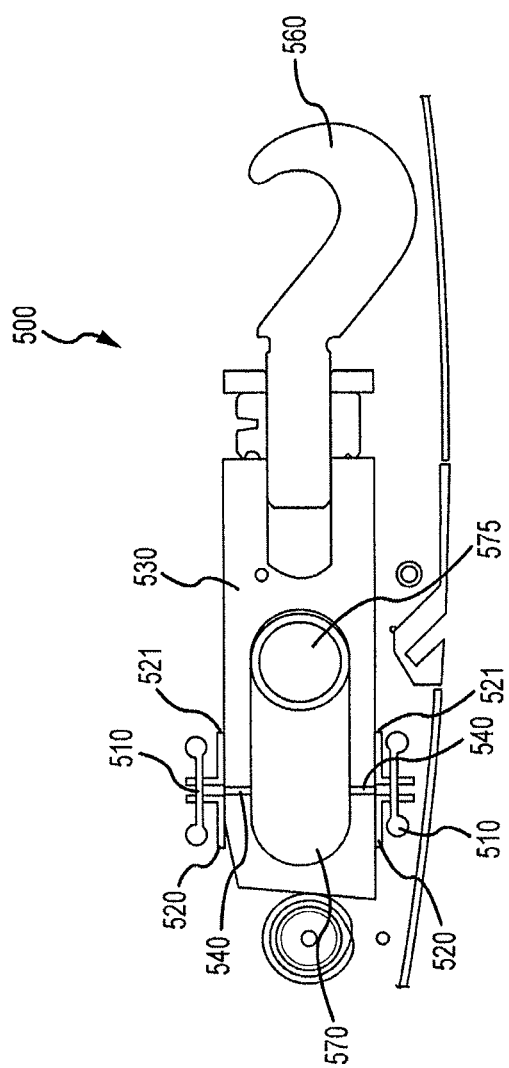
FIG. 5A, 5B, 5C, illustrate a latch hook assembly, in accordance with various embodiments.

In various embodiments, the separation of a latch hook assembly may be desired. With reference to FIG. 5A, FIG. 5A illustrates a latch hook assembly in accordance with various embodiments. In various embodiments, latch hook assembly 500 may comprise a latch hook 560 coupled to a latch housing 530, a weak point 540 in the latch housing disposed between an inboard mount 520 and an outboard mount 521, and catch pins 510 mounted to inboard mount 520 and outboard mount 521. In various embodiments and as previously described above, complimentary latch hook assemblies may be used together so that latch hook 560 engages a latch pin disposed in a slotted hole of a corresponding latch hook assembly. For example, latch pin 575 in slotted hole 570 may receive a latch hook from a corresponding latch hook assembly.

According to various embodiments, weak point 540 may be a portion of latch hook assembly 500 which is configured to separate at a predetermined tensile load, for example, 1,000 lb$_f$ (about 4,448 N) to about 3,000 lb$_f$ (about 13,344 N), a tensile load between about 1,500 lb$_f$ (about 6,672 N) to about 2,500 lb$_f$ (about 11,120 N), or a tensile load of about 2,000 lb$_f$ (about 8,896 N). The weak point is not particularly limited and may comprise the same or different material as latch housing 530. For example, in various embodiments, weak point 540 may comprise a material with a lower tensile strength than latch housing 530. In various embodiments, weak point 540 may comprise the same materials as latch housing 530, but may have a lower tensile strength due to the configuration of weak point 540, for example, due to drilled grooves or other configuration designed to lower the tensile strength of weak point 540.

In various embodiments, latch hook assembly may comprise catch pins 510. In various embodiments, catch pins 510 may be configured to withstand the tensile forces during an overpressure event. According to various embodiments, catch pins 510 may be longer than weak point 540 and, thus allow the IFS to expand during an overpressure event, while limiting the entire distance the latch hook assembly is allowed to separate.

Figure 5B:
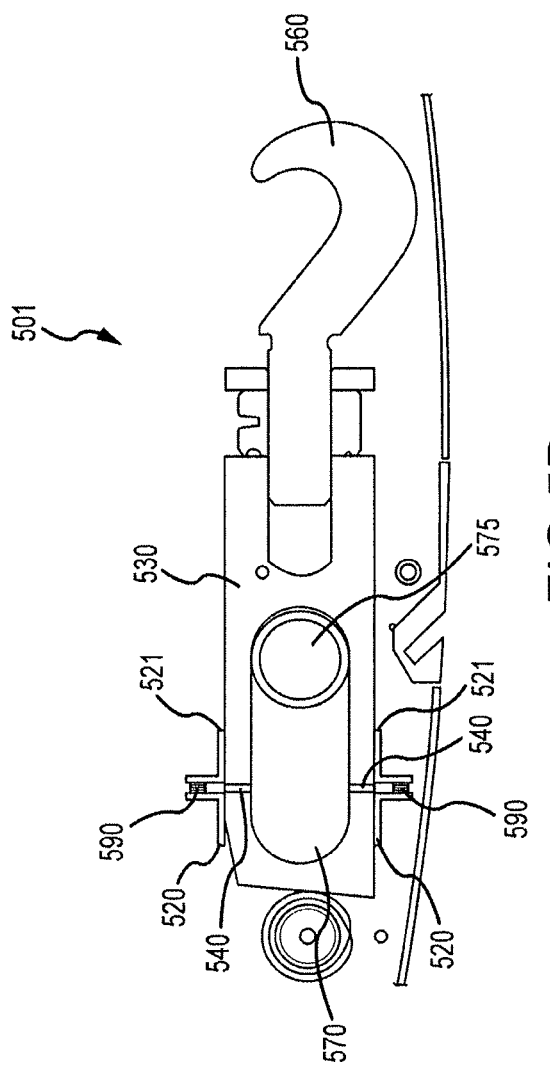
Figure 5C:
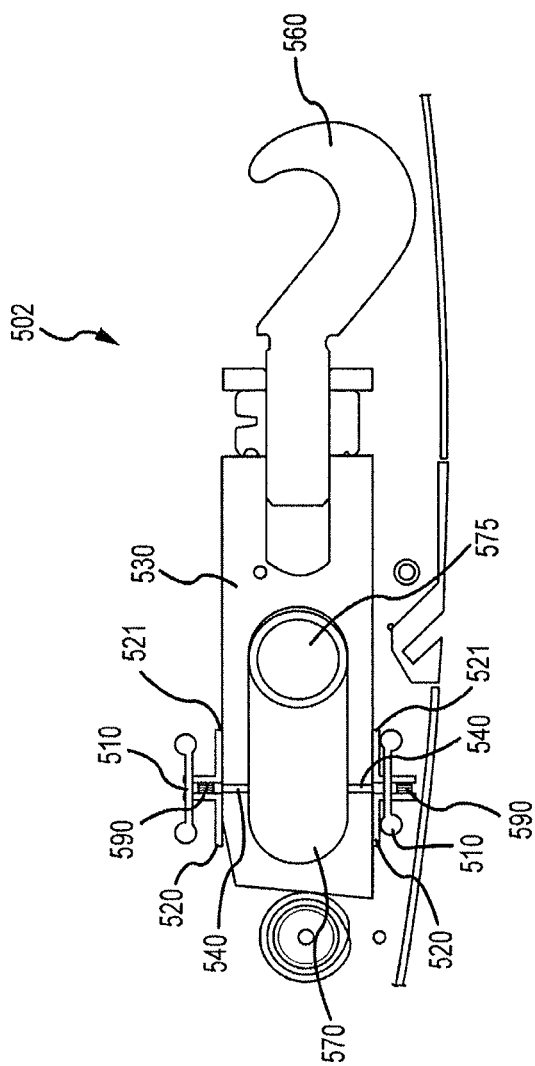
Figure 5D:
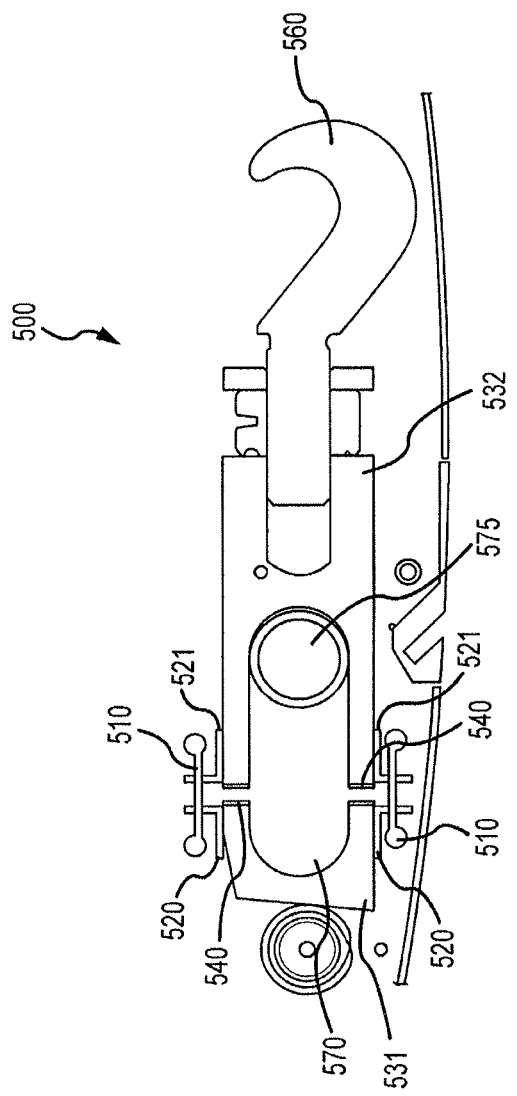
FIG. 5D illustrates a latch hook assembly during an overpressure event, in accordance with various embodiments.

With reference to FIG. 5D, FIG. 5D illustrates a latch hook assembly during or after an overpressure event according to various embodiments. As previously described, in various embodiments, latch hook assembly 500 may be configured to irreversibly separate at weak point 540. According to various embodiments, tensile forces on latch hook 560 may then be transferred to latch housing 530 (shown in FIG. 5A), which may then separate into inboard latch housing fragment 531 and outboard latch housing fragment 532, as illustrated in FIG. 5D. According to various embodiments, catch pins 510 coupled with inboard mount 520 and outboard mount 521 may then prevent separation of inboard latch housing fragment 531 and outboard latch housing fragment 532 beyond a predetermined distance. Thus, in various embodiments, catch pins 510 may be able to withstand the tensile forces during an overpressure event (e.g., a duct burst event). Accordingly, in various embodiments, latch hook assembly 500 may be configured to release overpressure in the IFS of a thrust reverser system while ensuring the IFS remains coupled to the latch hook assembly.

According to various embodiments, a latch hook assembly configured to reversibly separate may be desired. With reference to FIG. 5B, FIG. 5B illustrates latch hook assembly 501 where the catch member is a catch spring. Latch hook assembly 501 may comprise a latch hook 560 coupled to a latch housing 530, a weak point 540 in the latch housing disposed between an inboard mount 520 and an outboard mount 521, and a catch springs 590 mounted to inboard mount 520 and outboard mount 521. In various embodiments and as previously described above, complimentary latch hook assemblies may be used together so that latch hook 560 engages a latch pin disposed in a slotted hole of a corresponding latch hook assembly. For example, latch pin 575 in slotted hole 570 may receive a latch hook from a corresponding latch hook assembly.

According to various embodiments, weak point 540 may be a portion of latch hook assembly 500 which is configured to separate at a predetermined tensile load. The weak point is not particularly limited and may comprise the same or different material as latch housing 530. For example, in various embodiments, weak point 540 may comprise a material with a lower tensile strength than latch housing 530. In various embodiments, weak point 540 may comprise the same materials as latch housing 530, but may have a lower tensile strength due to the configuration of weak point 540, for example, due to drilled grooves or other configuration designed to lower the tensile strength of weak point 540. In various embodiments, weak point 540 may comprise an interface between two parts of latch housing 530 between outboard mount 521 and inboard mount 520. Thus, in various embodiments, weak point 540 may be configured to separate in response to a tensile load to yield an inboard latch housing fragment 531 and an outboard latch housing fragment 532, as demonstrated in FIG. 5E.

Figure 5E:
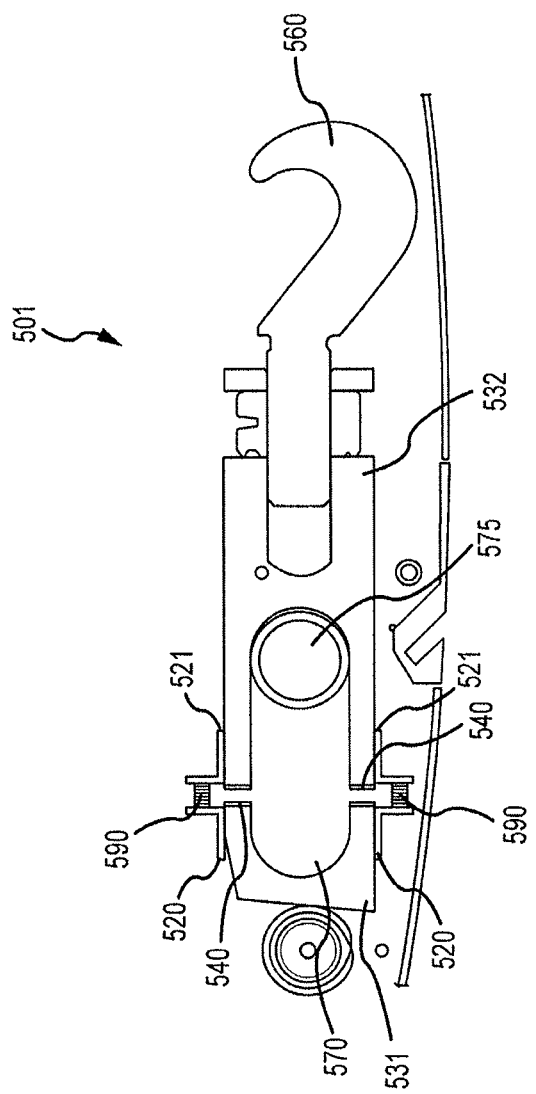
FIG. 5E illustrates a latch hook assembly during an overpressure event, in accordance with various embodiments.

FIG. 5E illustrates a latch hook assembly during an overpressure event in accordance with various embodiments. As described above, latch hook assembly 501 may be held together by weak point 540, which may separate during an overpressure event. During an overpressure event, a tensile force may be exerted on latch hook assembly 501 causing weak point 540 to separate. In various embodiments, catch springs 590 may be configured to expand during an overpressure event and, thus, may allow for reversible separation of latch hook assembly 501. According to various embodiments, catch springs 590 may have a spring constant between about 1,000 lb/ft (about 1,356 N/m) to about 3,000 lb/ft (about 4,067 N/m), between about 1,500 lb/ft (about 2,034 N/m) to about 2,500 lb/ft (about 3,390 N/m), or about 2,000 lb/ft (about 2,711 N/m) and, thus, may permit temporary separation of the IFS according to various embodiments.

Moreover, in various embodiments, latch hook assemblies may comprise two or more catch members (e.g., catch pins 510 and catch springs 590). For example, with reference to FIG. 5C, FIG. 5C illustrates a latch hook assembly 502 comprising a first catch member (catch pins 510) and a second catch member (catch springs 590), according to various embodiments. Latch hook assembly 502 may comprise a latch hook 560 coupled to a latch housing 530, a weak point 540 in the latch housing disposed between an inboard mount 520 and an outboard mount 521, and a both catch pins 510 and catch springs 590 mounted to inboard mount 520 and outboard mount 521. In various embodiments and as previously described above, complimentary latch hook assemblies may be used together so that latch hook 560 engages a latch pin disposed in a slotted hole of a corresponding latch hook assembly. For example, latch pin 575 in slotted hole 570 may receive a latch hook from a corresponding latch hook assembly.

According to various embodiments, weak point 540 may be a portion of latch hook assembly 500 which is configured to separate at a predetermined tensile load. The weak point is not particularly limited and may comprise the same or different material as latch housing 530. For example, in various embodiments, weak point 540 may comprise a material with a lower tensile strength than latch housing 530. In various embodiments, weak point 540 may comprise the same materials as latch housing 530, but may have a lower tensile strength due to the configuration of weak point 540, for example, due to drilled grooves or other configuration designed to lower the tensile strength of weak point 540. In various embodiments, weak point 540 may comprise an interface between two parts of latch housing 530 between outboard mount 521 and inboard mount 520.

According to various embodiments, incorporation of both catch pins 510 and catch springs 590 may allow for a latch hook assembly configured to reversibly separate, and, in various embodiments, may help prevent catch springs 590 from being stretched beyond their elastic limit. Accordingly, in various embodiments, catch pins 510 may be configured to prevent the separation of latch hook assembly beyond the elastic limit of catch springs 590.

In various embodiments, separation of the latch hook assembly, the latch housing assembly, and/or the latch assembly may permit a release of pressure in during a burst duct event. Accordingly, in various embodiments, separation of the latch hook assembly, the latch housing assembly, and/or the latch assembly may permit smaller inner fixed structures to be used in aircraft, thus saving on weight and fuel costs throughout the life of the aircraft. Furthermore, failure of the latch hook assembly, the latch housing assembly, and/or the latch assembly according to various embodiments may provide improved protection to engine and thrust reverser components during an overpressure event (e.g., a duct burst event) and may be easily replaceable by maintenance personnel. In various embodiments, the various latch hook assemblies are not particularly limited and can be modified according to manufacturer, customer (e.g., an airline), and/or governmental regulations.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A latch hook assembly, comprising:
   a latch housing including a first slotted hole;
   a first inboard mount coupled to the latch housing;
   a first outboard mount coupled to the latch housing;
   a latch hook coupled to the latch housing;
   a second inboard mount coupled to the latch housing;
   a second outboard mount coupled to the latch housing;
   a weak point in the latch housing disposed between the first inboard mount and the first outboard mount;
   a first latch pin disposed in the first slotted hole of the latch housing; and
   a first catch member mounted to the first inboard mount and the first outboard mount,
   a second catch member mounted to the second inboard mount and the second outboard mount, wherein the first catch member and the second catch member are configured to allow an inner fixed structure (IFS) to expand during an overpressure event;
   wherein the latch hook is configured to engage a second latch pin.

2. The latch hook assembly of claim 1, wherein the weak point is configured to fail in response to a tensile load between about 1,000 $lb_f$ to about 3,000 $lb_f$ to yield an inboard latch housing fragment and an outboard latch housing fragment.

3. The latch hook assembly of claim 1, wherein the weak point comprises the same material as the latch housing.

4. The latch hook assembly of claim 1, wherein the weak point comprises a material with a lower tensile strength than the latch housing.

5. The latch hook assembly of claim 1, wherein the weak point is configured to have a lower tensile strength than the latch housing.

6. The latch hook assembly of claim 1, wherein the first catch member is a first catch pin and the second catch member is a second catch pin.

7. The latch hook assembly of claim 6, further comprising a third catch member and a fourth catch member, the third catch member including a first catch spring, the third catch member mounted to the first inboard mount and the first outboard mount, the second catch member including a second catch spring, the second catch member mounted to the second inboard mount and the second outboard mount.

8. The latch hook assembly of claim 1, wherein the first catch member is a first catch spring, and wherein the second catch member is a second catch spring.

* * * * *